No. 738,697. PATENTED SEPT. 8, 1903.
A. PATTERSON.
VALVE FOR HYDRAULIC MACHINERY.
APPLICATION FILED MAY 13, 1902.
NO MODEL. 2 SHEETS—SHEET 2.

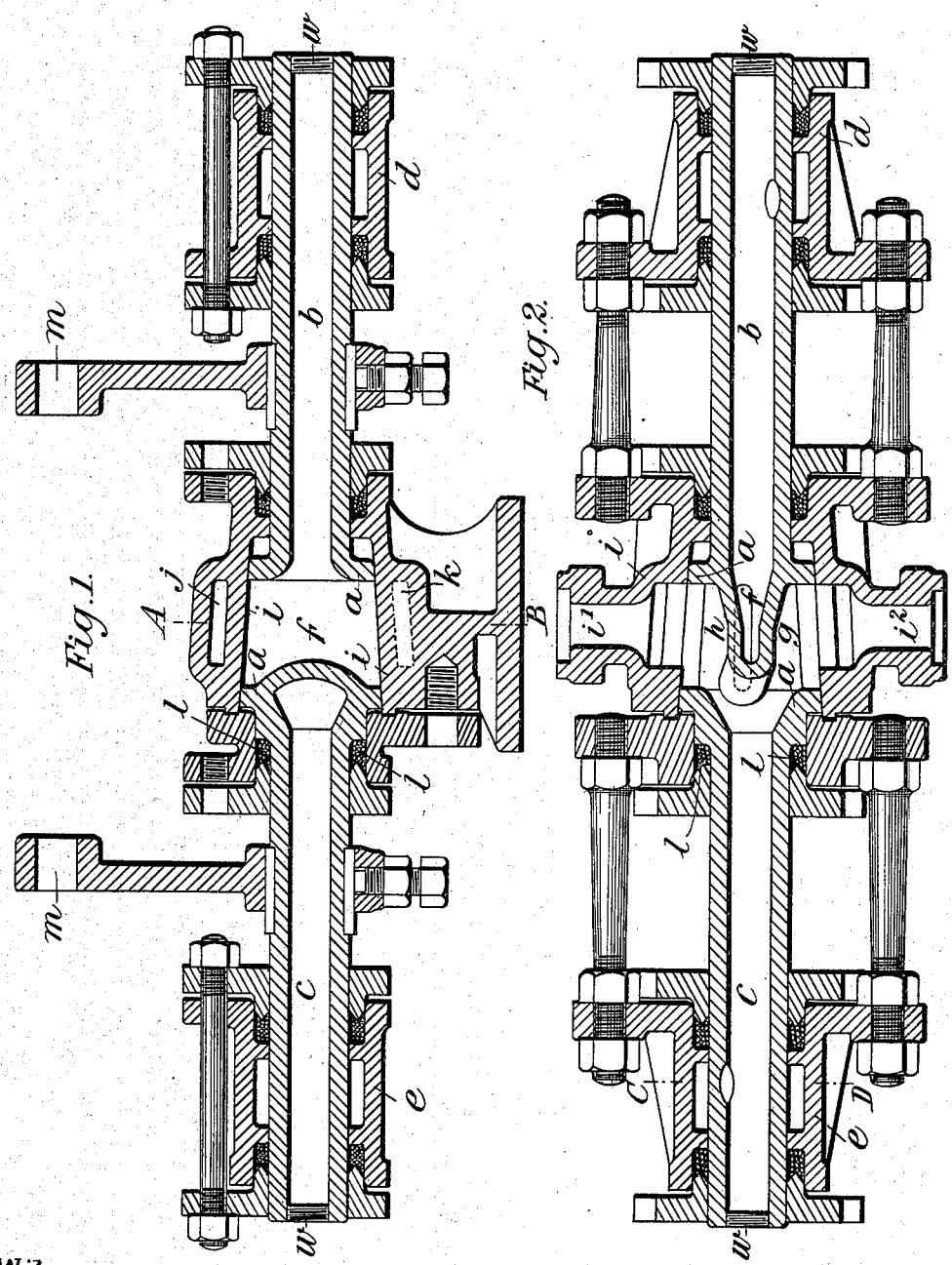

Witnesses:

Inventor.
A. Patterson
By Wilkinson & Fisher
Attorneys

No. 738,697. Patented September 8, 1903.

UNITED STATES PATENT OFFICE.

ANTHONY PATTERSON, OF CARDIFF, ENGLAND.

VALVE FOR HYDRAULIC MACHINERY.

SPECIFICATION forming part of Letters Patent No. 738,697, dated September 8, 1903.

Application filed May 13, 1902. Serial No. 107,175. (No model.)

*To all whom it may concern:*

Be it known that I, ANTHONY PATTERSON, a subject of the King of Great Britain, residing at Cardiff, in the county of Glamorgan, England, have invented certain new and useful Improvements in Valves for Hydraulic Machinery; and I do hereby declare the following to be a full, clear, and exact description of the invention, such as will enable others skilled in the art to which it appertains to make and use the same.

My invention relates to valves for hydraulic engines and for hydraulic machinery. By the improvements in which my invention consists such valves are of enhanced efficiency through being more completely water-tight. They are more thoroughly balanced, and hence the tear and wear in them is reduced, and they are actuated with greater ease and expedition and are under more complete control. They are suitable for very high water-pressures. The valves are less liable to shocks and consequent injury to themselves and the engines or machines in connection with which they are fitted and in the operation of which they are employed.

Figure 3:
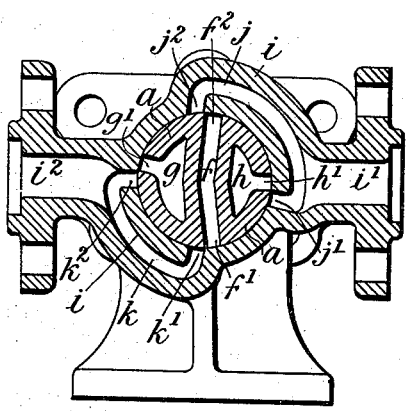
Figure 4:
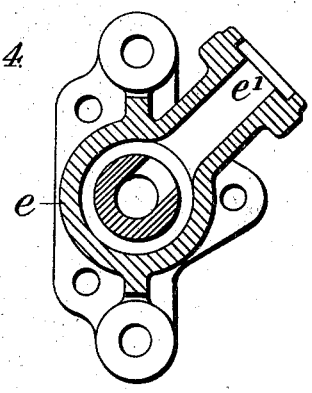

In the accompanying drawings, Figure 1 represents a section through the center of the center piece of a valve constructed in accordance with my invention. This form of valve is a working valve for a hydraulic reversing-engine—that is to say, it is the valve by which water is admitted to and exhausted from the cylinder of such engine. Fig. 2 is a section, also on the center line of the center piece, but at a right angle to the section, Fig. 1. Fig. 3 is a transverse section on the line A B, Fig. 1. Fig. 4 is a transverse section on the line C D, Fig. 2.

The valve has two throats $b$ and $c$, which extend in opposite directions from the center piece $a$, the throats $b$ and $c$ and the center piece $a$ being formed in one piece. The outer ends of the throats are closed with screw-plugs $w$, which are inserted after casting to fill apertures left for convenience in casting. At the outer end of the throat $b$ is a coupling-box $d$. A similar coupling-box $e$ is fitted on the outer end of the throat $c$. The coupling-boxes are connected to the casing $i$ by bolts and nuts, as shown in Fig. 2. By branches extending from the coupling-boxes the water supply and discharge pipes are connected to the valve. One such branch only is seen—namely, $e'$, Fig. 4. As will be understood, the throat $b$ is the water-supply throat and the throat $c$ is the exhaust-throat. The apertures for supply and exhaust are so arranged that the line of flow of the water therethrough is at right angles or approximately right angles to its flow in the valve-throats. This disposition of the apertures causes reduction of shock on admission of supply.

The center piece $a$ is conical in shape and serves to connect the throats $b$ and $c$. This center piece is provided with water-passages $f$, $g$, and $h$. The passage $f$ extends completely through the center piece near one diameter thereof and is connected with the throat $b$. The passages $g$ and $h$ are located on either side of the passage $f$ in the center piece $a$ and are nearly opposite each other and communicate with the throat $c$. The passage $f$ has a port $f'$ at one end and a port $f^2$ at the other end arranged to communicate with the ports $k'$ and $j^2$ in the casing, respectively, when the center piece $a$ is in the proper positions. The passage $g$ has a port $g'$, arranged to register with the port $k^2$, and the passage $h$ has a port $h'$, arranged to register with the port $j'$ at certain positions of the center piece.

The center piece $a$ is embraced by a casing $i$, which has branches $i'$ and $i^2$, by which communication is established with the engine. In the casing $i$ are two water-passages $j$ and $k$. The passage $j$ has two ports $j'$ and $j^2$. The passage $k$ has two ports $k'$ and $k^2$.

The valve is fitted with a stuffing-box $l$, which is stuffed with compressible or yielding packing, such as hemp packing or the like, and by the use of the stuffing-box thus packed the valve can be kept water-tight by tightening up the gland, which can be done to great nicety.

$m\ m$ are the levers by which the valve is connected for actuation to the engine.

The water admitted through one of the throats to the valve is, as the valve is oscillated by the engine, directed by the passages and ports above mentioned to each side alternately of the engine-piston and is exhausted through the other throat.

In valves constructed and arranged in accordance with my invention the water acts approximately evenly on all sides, and thus a better balance is obtained.

Having thus described my invention, what I claim as new, and desire to secure by Letters Patent of the United States, is—

1. In valves for hydraulic machinery, the combination of a valve composed of a center piece and two long hollow throats all made integral with each other, one of said throats terminating in a passage extending entirely through said center piece, and said center piece being made conical in form and provided with openings oppositely arranged on either side of said central passage, and said throats being provided near their outer ends with inlet and exhaust apertures respectively arranged at right angles to said throats, with a conical casing surrounding said center piece, and coupling-boxes separated from and independent of said casing and surrounding the inlet and exhaust apertures in said throats respectively, substantially as described.

2. In valves for hydraulic machinery, the combination of a valve composed of a conical center piece and two long hollow throats, one on each side of said center piece and all made integral with each other, one of said throats terminating in a passage extending entirely through said center piece, and said center piece being provided with openings oppositely arranged on either side of said central passage, and said throats being provided near their outer ends with inlet and outlet apertures, respectively, arranged at right angles to said throats, a conical casing surrounding said center piece, coupling-boxes surrounding the inlet and exhaust apertures in said throats respectively, said coupling-boxes being separated from and independent of said casing, and means connecting said coupling-boxes with said casing, substantially as described.

3. In valves for hydraulic machinery, the combination of a valve composed of a conical center piece and two long hollow throats all made integral with each other, one of said throats terminating in a passage extending entirely through said center piece, said center piece being provided with openings oppositely arranged on either side of said central passage, and said throats being provided near their outer ends with inlet and exhaust apertures, respectively, and arranged at right angles to said throats, a conical casing surrounding said center piece, and shifting mechanism connected to said throats on either side of said center piece, substantially as described.

In testimony whereof I affix my signature in presence of two witnesses.

ANTHONY PATTERSON.

Witnesses:
CLARA EMILY WAKEFORD,
STANLEY RALPH PATTERSON.